US007166666B2

(12) United States Patent
Ooba et al.

(10) Patent No.: US 7,166,666 B2
(45) Date of Patent: Jan. 23, 2007

(54) CURING COMPOSITION COMPRISING A POLYMER HAVING TWO OR MORE THIOL GROUPS PER MOLECULE, A COMPOUND HAVING TWO OR MORE ISOCYANATE GROUPS PER MOLECULE, CARBON BLACK AND SILICIC ACID OR SILICATE FILLER, AND/OR A PULVERIZED COAL FILLER

(75) Inventors: Tomohiro Ooba, Chiba (JP); Kazuhisa Sakae, Chiba (JP)

(73) Assignee: Toray Fine Chemicals Co., Ltd. (JP)

( * ) Notice: Subject to any disclaimer, the term of this patent is extended or adjusted under 35 U.S.C. 154(b) by 0 days.

(21) Appl. No.: 10/521,079

(22) PCT Filed: Jan. 14, 2003

(86) PCT No.: PCT/JP03/00198

§ 371 (c)(1),
(2), (4) Date: Jan. 12, 2005

(87) PCT Pub. No.: WO2004/009704

PCT Pub. Date: Jan. 29, 2004

(65) Prior Publication Data

US 2006/0167167 A1 Jul. 27, 2006

(30) Foreign Application Priority Data

Jul. 24, 2002 (JP) ............................ 2002-214958

(51) Int. Cl.
*C08K 3/04* (2006.01)

(52) U.S. Cl. ...................... 524/495; 524/442; 524/492; 524/59

(58) Field of Classification Search ................ 524/495, 524/59, 442, 492
See application file for complete search history.

(56) References Cited

U.S. PATENT DOCUMENTS

| | | | | |
|---|---|---|---|---|
| 2,466,963 | A | 4/1949 | Patrick et al. | |
| 3,923,748 | A | 12/1975 | Hutt et al. | |
| 4,092,293 | A | 5/1978 | Harris et al. | |
| 4,214,060 | A * | 7/1980 | Apotheker et al. | 525/387 |
| 4,366,307 | A | 12/1982 | Singh et al. | |
| 6,355,127 | B1 * | 3/2002 | Mahdi et al. | 156/155 |

FOREIGN PATENT DOCUMENTS

| | | | |
|---|---|---|---|
| JP | 46-3389 | | 1/1971 |
| JP | 47-48279 | | 2/1972 |
| JP | 56-14705 | | 2/1981 |
| JP | 56-15440 | | 2/1981 |
| JP | 57-56511 | | 4/1982 |
| JP | 60-210619 | | 10/1985 |
| JP | 60-210619 | A | 10/1985 |
| JP | 4-363325 | | 12/1992 |
| JP | 9-217008 | | 8/1997 |
| JP | 11-181397 | | 7/1999 |
| JP | 11-181397 | A | 7/1999 |
| JP | 2000-178334 | A | 6/2000 |
| JP | 2000-281894 | * | 10/2000 |
| WO | WO 99/54373 | A1 | 10/1999 |

OTHER PUBLICATIONS

Machine Translation of JP 2000-281894 (2000).*

* cited by examiner

*Primary Examiner*—Edward J. Cain
(74) *Attorney, Agent, or Firm*—DLA Piper US LLP

(57) ABSTRACT

A curing composition contains a polymer having two or more thiol groups per molecule, a compound having two or more isocyanate groups per molecule, and carbon black, and further contains a filler of which main ingredient is silicic acid or a silicate, or contains an organic filler of which main ingredient is pulverized coal. The curing composition has satisfactory storage stability of base compound and satisfactory curability event after storage of the base compound and, furthermore, gives a cured compound having sufficient strength at break, hardness, and gas-barrier properties. The curing composition is hence suitable for use as a sealant for insulating glass manufacture, vehicle window frames, etc.

20 Claims, No Drawings

CURING COMPOSITION COMPRISING A POLYMER HAVING TWO OR MORE THIOL GROUPS PER MOLECULE, A COMPOUND HAVING TWO OR MORE ISOCYANATE GROUPS PER MOLECULE, CARBON BLACK AND SILICIC ACID OR SILICATE FILLER, AND/OR A PULVERIZED COAL FILLER

TECHNICAL FIELD

The present invention relates to a curing composition. In particular, the present invention relates to a curing composition suitable for a sealant having sufficient strength and gas-barrier properties.

BACKGROUND ART

Previously, curing compositions composed of polymers, particularly polysulfide polymers, having two or more thiol groups per molecule and metal oxidizing agents, e.g., $PbO_2$ or $MnO_2$, have excellent barrier properties against water vapor and gases, excellent adhesion, and excellent weather resistance, and in addition, have sufficient strength. Therefore, the curing compositions have been used over the years as sealants for construction, civil engineering, automobiles, aircraft, or the like, sealants for insulating glass manufacture, adhesives, or coating compounds.

In particular, with respect to sealants for insulating glass manufacture, as described in Japanese Unexamined Patent Application Publication No. 9-217008, etc., the above-described curing compositions have a strength at break of 100 to 200 $N/cm^2$ in terms of properties and satisfactory gas-barrier properties as well, and therefore, are widely used in sections, e.g., sealants for insulating glass manufacture, required to have sufficient strength and gas-barrier properties.

Curing compositions composed of polymers having two or more thiol groups per molecule and compounds having two or more isocyanate groups per molecule have satisfactory dynamic durability. Furthermore, similarly to curing compositions composed of the polymers having two or more thiol groups per molecule and the metal oxidizing agents, even when cured compounds are exposed to the outdoors over an extended time period after being applied, the surfaces of the cured compounds are not stained, so that excellent anti-staining properties are exhibited and, in addition, excellent adhesion is also exhibited. The curing compositions composed of polymers having two or more thiol groups per molecule and compounds having two or more isocyanate groups per molecule are used as polysulfide-based sealants composed of thiol-containing polysulfide polymers and polyisocyanate compounds, and are used as sealants for construction, civil engineering, etc., adhesives, or coating compounds. Since the curing compositions composed of polymers having two or more thiol groups per molecule and compounds having two or more isocyanate groups per molecule include no metal oxidizing agent and, therefore, are environmentally friendly, the replacement of metal oxidizing agent curing system has become rapidly widespread in recent years.

However, when polysulfide-based sealants based on polyisocyanate compounds are used as sealants for insulating glass manufacture, vehicle window frames, etc., with the same formulation as in the curing compositions based on the metal oxidizing agents, the strength at break and the hardness of the cured compounds are low and, therefore, the resulting cured compounds simply have unsatisfactory properties. Furthermore, polysulfide-based sealants based on polyisocyanate compounds have poor gas-barrier properties. It is known that carbon black is used as a reinforcing material to improve the hardness of the polysulfide-based sealants. When the amount of carbon black used as a reinforcing material is increased, the strength at break is improved. However, there are problems in that the storage stability of base compound is significantly deteriorated and the workability after storage of the base compound is also deteriorated.

SUMMARY

A curing composition of the present invention is a curing composition containing a polymer having two or more thiol groups per molecule, a compound having two or more isocyanate groups per molecule, and carbon black and further containing a filler of which main ingredient is silicic acid or a silicate, or further containing an organic filler of which main ingredient is pulverized coal.

Furthermore, preferably, the curing composition of the present invention contains a polymer having two or more thiol groups per molecule, a compound having two or more isocyanate groups per molecule, and carbon black, and further contains a filler of which main ingredient is silicic acid or a silicate, or further contains an organic filler of which main ingredient is pulverized coal, in which a hydrocarbon plasticizer is used as a plasticizer, and an organometallic compound is used as a curing catalyst, so that a high-performance curing composition having further excellent mechanical strength and gas-barrier properties can be attained.

DETAILED DESCRIPTION

A curing composition of the present invention contains a polymer having two or more thiol groups per molecule, a compound having two or more isocyanate groups per molecule, and carbon black, and further contains a filler of which main ingredient is silicic acid or a silicate, or contains an organic filler of which main ingredient is pulverized coal.

Furthermore, preferably, the curing composition of the present invention contains a polymer having two or more thiol groups per molecule, a compound having two or more isocyanate groups per molecule, and carbon black, and further contains a filler of which main ingredient is silicic acid or a silicate, or contains an organic filler of which main ingredient is pulverized coal, in which a hydrocarbon plasticizer is used as a plasticizer, and an organometallic compound is included as a curing catalyst.

The polymer having two or more thiol groups per molecule and the compound having two or more isocyanate groups per molecule in the curing composition of the present invention form thiourethane bonds through the reaction between thiol groups and isocyanate groups and, thereby, the composition is cured at room temperature.

The polymers, compounds, etc., related to the curing composition of the present invention will be described below.

Initially, (a) the polymer having two or more thiol groups per molecule will be described.

The polymer having two or more thiol groups per molecule may be a polymer having two or more thiol groups per molecule and including an ether bond, a thioether bond, a disulfide bond, an urethane bond and/or an ester bond in a main chain.

Preferable examples of the above-described polymers having two or more thiol groups per molecule include polyoxyalkylene polyols described in Japanese Examined Patent Application Publication No. 47-48279 and polymercaptans described in U.S. Pat. No. 4,092,293 and Japanese Examined Patent Application Publication No. 46-3389. Other examples of polymers having two or more thiol groups per molecule include thiol terminated liquid polymers described in U.S. Pat. No. 3,923,748 and thiol terminated thioethers of liquid thioethers described in U.S. Pat. No. 4,366,307. Furthermore, particularly preferable polymers are polysulfide polyether polymers or polysulfide polymers described below. The number average molecular weight of such a polymer having two or more thiol groups per molecule is usually 100 to 200,000, and preferably is 400 to 100,000.

Examples of polysulfide polyether polymers preferably used in the present invention will be described.

In the present invention, preferably, a polysulfide polyether polymer includes:

(1) a polyether section represented by $$—(R^1O)n-$$

(where $R^1$ represents an alkylene group having the carbon number of 2 to 4, and n represents an integer of 6 to 200) and (2) a structural unit represented by

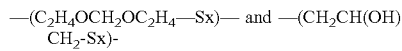

$$—(C_2H_4OCH_2OC_2H_4—Sx)— \text{ and } —(CH_2CH(OH)CH_2\text{-}Sx)\text{-}$$

(where x represents an integer of 1 to 5) in a main chain, and in addition, has (3) thiol groups represented by

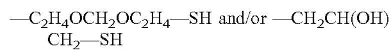

$$—C_2H_4OCH_2OC_2H_4—SH \text{ and/or } —CH_2CH(OH)CH_2—SH$$

at terminals.

In this polysulfide polyether polymer, the polyether section of the above-described (1) and the structural unit of the above-described (2) may be bonded in any arrangement. With respect to the proportions thereof, preferably, the component $—(R^1O)n\text{-}$ of (1) is 2 to 95 percent by weight, the component $(C_2H_4OCH_2OC_2H_4—Sx)$ of (2) is 3 to 70 percent by weight, and the component $(CH_2CH(OH)CH_2—Sx)$ of (2) is 1 to 50 percent by weight. The number average molecular weight of this polysulfide polyether polymer is usually 600 to 200,000, and preferably is 800 to 50,000. The above-described polysulfide polyether polymer can be produced by a method described in Japanese Unexamined Patent Application Publication No. 4-363325.

Examples of polysulfide polymers preferably used in the present invention will be described.

In the present invention, preferably, a polysulfide polymer includes:

(4) a structural unit represented by

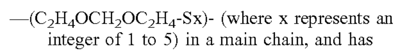

$—(C_2H_4OCH_2OC_2H_4\text{-}Sx)\text{-}$ (where x represents an integer of 1 to 5) in a main chain, and has (5) thiol groups represented by $—C_2H_4OCH_2OC_2H_4—SH$ at terminals. This polysulfide polymer usually has fluidity at room temperature, and has a number average molecular weight of 100 to 200,000, and preferably of 400 to 50,000. Preferable examples of the above-described polysulfide polymer are described in U.S. Pat. No. 2,466,963.

Next, (b) the compound having two or more isocyanate groups per molecule will be described.

In the present invention, preferably, an organic polyisocyanate compound and/or an urethane prepolymer produced by reacting an active-hydrogen-containing compound with an organic polyisocyanate compound is used as the compound having two or more isocyanate groups per molecule.

Specific examples of organic polyisocyanate compounds include tolylene diisocyanate, diphenylmethane diisocyanate, polymethylene polyphenyl isocyanate (crude MDI), xylylene diisocyanate, isophorone diisocyanate, norbornane diisocyanate, and hexamethylene diisocyanate.

Examples of active-hydrogen-containing compounds include hydroxy terminated polyesters; polyvalent polyalkylene ethers; hydroxy terminated polyurethane polymers; acrylic polyols in which hydroxyl groups are introduced in acrylic copolymers; hydroxyl terminated polybutadienes; polyvalent thioethers; polyacetals; aliphatic polyols; alkane, alkene, and aliphatic thiols including alkylene thiols having two or more thiol groups; polysulfide polymers having thiol groups at terminals; diamines including, e.g., aromatic, aliphatic, and heterocyclic diamines; and mixtures thereof.

With respect to the curing composition of the present invention, it is also possible to react (a) the polymer having two or more thiol groups per molecule with (b) the compound having two or more isocyanate groups per molecule in advance and to use as a one-component curing composition. In this case, it is preferable to use only the urethane prepolymer produced by reacting the above-described thiol-containing compound with the organic polyisocyanate compound in the presence of excess isocyanate compound.

In the present invention, preferably, the molar ratio (isocyanate groups/thiol groups) of isocyanate groups in (b) the compound having two or more isocyanate groups per molecule to thiol groups in (a) the polymer having two or more thiol groups per molecule is adjusted to be 0.5 to 4.0. If the molar ratio of isocyanate groups to thiol groups is less than 0.5, undesirably, the molecular weight of the curing composition may not be increased sufficiently. On the other hand, if the molar ratio of isocyanate groups to thiol groups exceeds 4.0, undesirably, the cured compound may become hard and brittle. More preferably, the molar ratio of isocyanate groups to thiol groups is 0.7 to 3.0.

Next, (c) the carbon black will be described.

Examples of carbon black used in the present invention include carbon black produced by a channel system, a gas furnace system, an oil furnace system, a thermal system, and an acetylene system.

Specific examples of carbon black include EPC carbon, MPC carbon, CC carbon, SAF carbon, ISAF carbon, HAF carbon, MAF carbon, FEF carbon, HMF carbon, SRF carbon, SPF carbon, GPF carbon, APF carbon, FF carbon, CF carbon, SCF carbon, ECF carbon, FT carbon, MT carbon, and acetylene black. Among them, SRF carbon and MT carbon are particularly preferable because the mechanical strength of the cured compound is improved, and the workability is satisfactory. Specific examples thereof include trade name: Asahi #15 produced by ASAHI CARBON CO., LTD., and Thermax MT produced by SHIRAISHI CALCIUM KAISHA, LTD.

If the average particle diameter of the carbon black becomes less than 60 nm, although significant effect is exerted on an improvement of the mechanical strength of the cured compound, undesirably, the workability may be significantly deteriorated. If the average particle diameter exceeds 600 nm, undesirably, an effect of an improvement of the mechanical strength of the cured compound may become small. A preferable average particle diameter of the carbon black is 60 to 600 nm.

Preferably, the amount of blend of the carbon black is 20 to 200 parts by weight relative to 100 parts by weight of the sum of (a) the polymer having two or more thiol groups per molecule and (b) the compound having two or more isocyanate groups per molecule, and more preferably is 50 to 150 parts by weight. If the amount of blend of the carbon black is less than 20 parts by weight, undesirably, an effect of an improvement of the mechanical strength of the cured compound may become small. If the amount exceeds 200 parts by weight, undesirably, the workability may be deteriorated, or it is undesirable economically.

Next, (d-1) the filler including mainly silicic acid or a silicate will be described.

The filler of which main ingredient is silicic acid or a silicate is a filler containing 60% or more of silicic acid or a silicate, and preferably 70% or more of silicic acid or a silicate.

Examples of synthetic products serving as the filler of which main ingredient is silicic acid or a silicate include white carbon that is fine-grained silicic acid produced by a dry method or a wet method. Preferably, the filler of which main ingredient is silicic acid or a silicate is a filler containing silicic acid or a silicate.

Examples of minerals serving as the filler of which main ingredient is silicic acid or a silicate include kaolin composed of minerals, such as kaolinite and hallosite, diatomite originated from rock composed of diatom frustule, talc produced from talcose rock, perlite originated from perlite rock, bentonite and acid clay including mainly a montmorillonite clay mineral, activated clay produced by treating a montmorillonite clay mineral with a mineral acid, and furthermore, sepiolite, Zeeklite, wollastonite, sericite, mica, silica, silica sand, and silica stone. Among them, perlite, acid clay, and white carbon are preferable because significant effects are exerted on suppression of coverage of the surface of the base compound with a film after the storage of the base compound, suppression of the increase in the viscosity of the base compound after the storage of the base compound and, in addition, suppression of reduction of the pot life and the tack free time after the storage of the base compound. Furthermore, the acid clay and the white carbon are particularly preferable because a significant effect is exerted on suppression of reduction of the elongation at break of the cured compound after the storage of the base compound.

Preferably, the amount of blend of the filler of which main ingredient is silicic acid or a silicate is 0.5 to 50 parts by weight relative to 100 parts by weight of the sum of (a) the polymer having two or more thiol groups per molecule and (b) the compound having two or more isocyanate groups per molecule, and more preferably is 1 to 50 parts by weight. If the amount of blend of the filler including mainly silicic acid or a silicate is less than 0.5 parts by weight, undesirably, an effect of an improvement of the storage stability of the base compound may become small or an effect of the stabilization of the curability after the storage of the base compound may become small. If the amount exceeds 50 parts by weight, undesirably, the mechanical strength may be reduced, the workability may be deteriorated, or it is undesirable economically.

Next, (d-2) the organic filler of which main ingredient is pulverized coal will be described.

The organic filler of which main ingredient is pulverized coal is a filler containing 90% or more of pulverized coal, and preferably 95% or more of pulverized coal.

Examples of organic fillers of which main ingredient is pulverized coal include pulverized products of peat, lignite, brown coal, bituminous coal, and anthracite. In particular, pulverized products of bituminous coal and anthracite having the carbon content of 80% or more on a dry and ashless basis are preferable because the effects of reducing the specific gravity of the cured compound and improving the mechanical strength are significant and, in addition, the effect of suppressing the reduction of the pot life and the tack free time after the storage of the base compound is significant. Specific examples of organic fillers of which main ingredient is pulverized coal include a fine-grained bituminous filler having a trade name: Mineral Black 325BA produced by SHIRAISHI CALCIUM KAISHA, LTD.

Preferably, the amount of blend of the organic filler of which main ingredient is pulverized coal is 0.5 to 150 parts by weight relative to 100 parts by weight of the sum of (a) the polymer having two or more thiol groups per molecule and (b) the compound having two or more isocyanate groups per molecule, and more preferably is 1 to 100 parts by weight. If the amount of blend of the organic filler of which main ingredient is pulverized coal is less than 0.5 parts by weight, undesirably, an effect of the improvement of the mechanical strength or on the reduction of the specific gravity may become small, or an effect of the stabilization of the curability after the storage of the base compound may become small. If the amount exceeds 150 parts by weight, undesirably, the workability may be deteriorated, or it is undesirable economically.

In the curing composition of the present invention, any one of (d-1) the filler of which main ingredient is silicic acid or a silicate and (d-2) the organic filler of which main ingredient is pulverized coal must be used, but these may be used simultaneously.

Next, (e) the plasticizer will be described.

The plasticizer can be blended into the curing composition of the present invention. Phthalic acid esters, trimellitic acid esters, aliphatic dibasic acid esters, etc., can be used as the plasticizer in the curing composition of the present invention. Specific examples thereof include butylbenzyl phthalate, dibutyl phthalate, diheptyl phthalate, di-2-ethylhexyl phthalate, di-n-octyl phthalate, diisodecyl phthalate, diisononyl phthalate, tri-2-ethylhexyl trimellitate, di-2-ethylhexyl adipate, diisodecyl adipate, diisononyl adipate, dibutyl diglycol adipate, dibutyl sebacate, and di-2-ethylhexyl sebacate.

Furthermore, diarylalkane type compounds, triaryldialkane type compounds, high-boiling point aromatic hydrocarbons composed of reaction products between dimer to trimer of styrene and alkylbenzene (trade name "Nisseki Hisol SAS-LH" produced by Nippon Petrochemicals Co., Ltd.) exemplified in Japanese Examined Patent Application Publication No. 56-14705, Japanese Examined Patent Application Publication No. 56-15440, Japanese Examined Patent Application Publication No. 57-56511, etc., can be used as the hydrocarbon plasticizer in the present invention. Chlorinated paraffin and hydrogenated terphenyl (trade name "ThermS-900" produced by Nippon Steel Chemical Co., Ltd.) can also be used. The hydrocarbon plasticizers, e.g., triaryldialkane, are preferable because the hygroscopicity is small, and the gas-barrier properties are satisfactory.

The amount of blend of the above-described plasticizer depends on the amount of a filler to be used simultaneously. However, preferably, the amount of the plasticizer to be used is usually within the range of 10 to 100 parts by weight relative to 100 parts by weight of the sum of (a) the polymer having two or more thiol groups per molecule and (b) the compound having two or more isocyanate groups per molecule.

Next, (f) the curing catalyst will be described.

In order to promptly and reliably advance the curing after application, the curing catalyst for reacting thiol groups with isocyanate groups can be added to the curing composition of the present invention.

Specifically, tertiary amines, organometallic compounds, etc., can be used as the curing catalyst for the curing composition of the present invention. Examples of tertiary amines include monoamines, diamines, triamines, polyamines, cyclic amines, alcoholamines, and etheramines. Specific examples thereof include triethylamine, N,N-dimethylcyclohexylamine, N,N,N',N'-tetramethylethylenediamine, N,N,N',N'-tetramethylpropane-1,3-diamine, N,N,N',N'-tetramethylhexane-1,6-diamine, N,N,N',N'',N''-pentamethyldiethylenetriamine, N,N,N',N'',N''-pentamethyldipropylenetriamine, tetramethylguanidine, N,N-dipolyoxyethylene stearylamine, N,N-dipolyoxyethylene tallowalkylamine, triethylenediamine, N,N'-dimethylpiperazine, N-methyl-N'-(2-dimethylamino)-ethylpiperazine, N-methylmorpholine, N-ethylmorpholine, N—(N',N'-dimethylaminoethyl)-morpholine, 1,2-dimethylimidazole, dimethylaminoethanol, dimethylaminoethoxyethanol, N,N,N'-trimethylaminoethylethanolamine, N-methyl-N'-(2-hydroxyethyl)-piperazine, N-(2-hydroxyethyl)-morpholine, bis-(2-dimethylaminoethyl)ether, and ethylene glycol bis-(3-dimethylaminopropyl)ether. Among them, N,N-dipolyoxyethylene alkylamine compounds are preferable. Specific examples thereof include N,N-dipolyoxyethylene stearylamine and N,N-dipolyoxyethylene tallowalkylamine. Two or more types of these tertiary amines may be used.

In the curing composition of the present invention, aliphatic acid salts of various metals can be used as the organometallic compounds. Examples of metals thereof include cobalt, lead, manganese, zinc, copper, iron, calcium, zirconium, lithium, chromium, magnesium, cerium, barium, aluminum, cadmium, strontium, and indium. Examples of higher aliphatic acids include octylic acid, naphthenic acid, neodecanoic acid, butyric acid, caproic acid, caprylic acid, capric acid, lauric acid, myristic acid, palmitic acid, stearic acid, arachidic acid, behenic acid, lignoceric acid, cerotic acid, montanic acid, melissic acid, obtusilic acid, linderic acid, tsuzuic acid, physeteric acid, myristoleic acid, zoomaric acid, petroselinic acid, oleic acid, vaccenic acid, gadoleic acid, cetoleic acid, erucic acid, selacholeic acid, linoleic acid, hiragoic acid, eleostearic acid, punicic acid, tricosanic acid, linolenic acid, moroctic acid, parinaric acid, arachidonic acid, clupanodonic acid, scoliodonic acid, and herring acid. Specific examples of organometallic compounds include cobalt naphthenate, lead naphthenate, manganese naphthenate, zinc naphthenate, copper naphthenate, iron naphthenate, calcium naphthenate, zirconium naphthenate, lithium naphthenate, chromium naphthenate, magnesium naphthenate, cobalt octylate, lead octylate, manganese octylate, zinc octylate, copper octylate, iron octylate, calcium octylate, zirconium octylate, lithium octylate, chromium octylate, magnesium octylate, cerium octylate, barium octylate, and aluminum octylate. Among them, organotin compounds having less effect on discoloration, etc., are preferable, and more preferable examples include dialkyltin mercaptide, dialkyltin bis(carboxylate), dialkyltin bis(dicarboxylate monoalkyl ester), and dialkyltin dicarboxylate. Furthermore, acetylacetone metal salts, 2,4-pentanedione metal salts, etc., which are inner complex salt type chelate compounds of the above-described metals, can also be used. Specific examples thereof include acetylacetone aluminum, acetylacetone zinc, acetylacetone manganese, acetylacetone calcium, and acetylacetone indium.

In particular, with respect to the composition of the present invention, the organometallic compounds are used preferably because the storage stability is satisfactory compared with that in the case of amine catalysts. Among them, indium-based organometallic compounds are particularly preferable because the initial hardness of the cured compound is satisfactorily exhibited. Two or more types of organometallic compound may be used.

Next, (g) other materials to be compounded will be described.

In order to further improve the economical efficiency, the workability in the application of the composition, and the properties after the curing, fillers and additives, e.g., calcium carbonate and titanium oxide, can be used for the curing composition of the present invention.

Furthermore, in order to improve the adhesion to the material portion, e.g., glass and aluminum, after application, an adhesion promoter can be added to the curing composition of the present invention.

Specifically, a silane coupling agent, etc., is used as the adhesion promoter. Examples of silane coupling agents include γ-methacryloxypropyltrimethoxysilane, γ-glycidoxypropyltrimethoxysilane, γ-mercaptopropyltrimethoxysilane, vinyltrimethoxysilane, vinyltris(β-methoxyethoxy)silane, vinyltriethoxysilane, β-(3,4-epoxycyclohexyl)ethyltrimethoxysilane, γ-glycidoxypropyldimethoxysilane, and γ-glycidoxypropylmethyldiethoxysilane. Furthermore, a polysulfide polymer having trimethoxysilane-modified terminals, the polymer being described in Japanese Unexamined Patent Application Publication No. 6-271833 and being synthesized by reacting a polysulfide polymer "Thiokol LP3" with γ-glycidoxypropyltrimethoxysilane, can also be used as the silane coupling agent. Two or more types of these silane coupling agents may be used.

In addition, in order to improve the residual tack on the surface after the curing, a compound having air-oxidizable unsaturated groups, described in Japanese Unexamined Patent Application Publication No. 2000-178334, can be added to the curing composition of the present invention.

Examples of compounds having air-oxidizable unsaturated groups include drying oils, diene-based compounds, and various modified substances of drying oils. Specifically, fats and fatty oils (drying oils and fish oils) which are mixed triglycerides of unsaturated aliphatic acids and which have an iodine number of 130 or more can be used. Examples of unsaturated aliphatic acids include obtusilic acid, linderic acid, tsuzuic acid, physeteric acid, myristoleic acid, zoomaric acid, petroselinic acid, oleic acid, vaccenic acid, gadoleic acid, cetoleic acid, erucic acid, selacholeic acid, linoleic acid, hiragoic acid, eleostearic acid, punicic acid, tricosanic acid, linolenic acid, moroctic acid, parinaric acid, arachidonic acid, clupanodonic acid, scoliodonic acid, and herring acid. Specific examples of vegetable oils include linseed oil, perilla oil, tung oil, Japanese tung oil, oiticica oil, hempseed oil, kaya oil, inukaya oil, walnut oil, Japanese walnut oil, poppy seed oil, sunflower oil, soybean oil, and safflower oil. Examples of fish oils include sardine oil, herring oil, and menhaden oil. In addition to them, isomerized oils produced by alkali isomerization of fish oils, dehydrated castor oil produced by dehydration of castor oil, etc., are included. Particularly preferable examples include tung oil and oiticica oil, in which unsaturated aliphatic acids having conjugated double bond, e.g., eleostearic acid, are contained at a high content.

In the present invention, it is desirable that the amount of addition of the drying oil is 0.1 to 50 parts by weight relative to 100 parts by weight of the sum of the polymer having the number of active hydrogen of two or more per molecule and the compound having two or more isocyanate groups per molecule. If the amount of addition is 0.1 parts by weight or less, the effect of improving the residual tack may become poor, and if the amount of addition is 50 parts by weight or more, the economical efficiency and the odor may become unsatisfactory.

Furthermore, in the present invention, it is particularly preferable that the active-hydrogen-containing compound and the organic polyisocyanate compound are subjected to synthesis in the presence of excess isocyanate compound while the compound containing air-oxidizable unsaturated groups is present simultaneously, because the compound having two or more isocyanate groups per molecule and the compound containing air-oxidizable unsaturated groups can be present stably.

According to the present invention, the curing composition composed of the polymer having two or more thiol groups per molecule, the compound having two or more isocyanate groups per molecule, and carbon black is blended with the filler of which main ingredient is silicic acid or a silicate and/or the organic filler of which main ingredient is pulverized coal, and if necessary, the hydrocarbon plasticizer is used as a plasticizer, and the organometallic compound is used as a curing catalyst, so that the curing composition suitable for use as a high-strength sealant having excellent mechanical strength and excellent gas-barrier properties can be attained.

The curing composition of the present invention will be described in further detail with reference to the following examples.

SYNTHESIS EXAMPLE 1

After 800 g of di-functional polypropylene glycol (OH value 55.3 mgKOH/g) produced by adding propylene oxide to propylene glycol, 87.7 g of epichlorohydrin, and 1.0 g of stannic chloride pentahydrate were put in a reaction vessel, agitation was performed at 80° C. to 90° C. for 3 hours. Furthermore, 887.7 g of polysulfide polymer (trade name "Thiokol LP55" produced by Toray Fine Chemicals Co., Ltd.) was added and mixed and, thereafter, 76 g of sodium hydrosulfide (purity 70%) was added, followed by agitation at 80° C. for 2 hours. Subsequently, 7.1 g of 50% aqueous solution of citric acid was added, and agitation was performed for 15 minutes, followed by dehydration. Furthermore, salts were removed, so that a transparent light yellow polymer having a mercaptan content of 2.0 percent by weight and a viscosity of 80 poise (25° C.) was prepared.

EXAMPLES 1 to 4

A base compound was prepared by blending the polymer of Synthetic example 1 with a plasticizer, fillers, and additives in the formulation shown in Table 1. The thus prepared base compound was placed in a constant temperature bath at 50° C., and a change in the surface state was evaluated. The results are shown in Table 3. Furthermore, 350 parts by weight of this base compound and 51 parts by weight of urethane prepolymer (isocyanate content 5.3 percent by weight) prepared by adding xylylene diisocyanate to polypropylene glycol were mixed. The length of time that the resulting mixture pulled up with a spatula was in a gel state was referred to as the pot life. The time that elapsed before the cured compound became unable to adhere to a polyethylene terephthalate sheet was referred to as the tack free time. Likewise, the pot life and the tack free time were measured with respect to base compounds after being stored at 23° C. for 2 weeks and 4 weeks. The measurement results of the hardness (JIS A hardness) of the cured compounds are also shown in Table 3.

COMPARATIVE EXAMPLE 1

A base compound was prepared by blending the polymer of Synthetic Example 1 with a plasticizer, fillers, and additives in the formulation shown in Table 2. The thus prepared base compound was placed in a constant temperature bath at 50° C., and a change in the surface state was evaluated. The results are shown in Table 3. Furthermore, 350 parts by weight of this base compound and 51 parts by weight of urethane prepolymer (isocyanate content 5.3 percent by weight) prepared by adding xylylene diisocyanate to polypropylene glycol were mixed. The pot life, the tack free time, and the hardness of the cured compound were measured in a manner similar to that in Examples, and the measurement results are shown in Table 3. In Comparative example 1, after the base compound was stored at 23° C., the pot life was significantly decreased from 40 minutes to 20 minutes and, therefore, a large change due to the storage was observed in the curability. Furthermore, after the base compound was stored at 50° C., the surface of the base compound was covered with a film and, therefore, a large change due to the storage was observed in the state of the base compound.

TABLE 1

| Raw Material | Formulation (parts by weight) |
| --- | --- |
| Polymer of Synthetic example 1 | 100 |
| Plasticizer dioctyl phthalate | 56 |
| Filler calcium carbonate | 90 |
| Filler carbon black (trade name Thermax MT N-990: SHIRAISHI CALCIUM KAISHA, LTD.) | 100 − x |
| Filler perlite (trade name Perlite B-409: Mitsui Mining & Smelting Co., Ltd.) pulverized coal (trade name Mineral Black 325BA: SHIRAISHI CALCIUM KAISHA, LTD.) | x |
| Curing catalyst di-n-butyltin dilaurate | 2 |
| Additive γ-glycidoxypropyltrimethoxysilane (trade name SH6040: Dow Corning Toray Silicone Co., Ltd.) | 2 |

TABLE 2

| Raw Material | Formulation (parts by weight) |
| --- | --- |
| Polymer of Synthetic example 1 | 100 |
| Plasticizer dioctyl phthalate | 56 |
| Filler calcium carbonate | 90 |
| Filler carbon black (trade name Thermax MT N-990: SHIRAISHI CALCIUM KAISHA, LTD.) | 100 |
| Curing catalyst di-n-butyltin dilaurate | 2 |
| Additive γ-glycidoxypropyltrimethoxysilane (trade name SH6040: Dow Corning Toray Silicone Co., Ltd.) | 2 |

TABLE 3

| | Comparative example 1 | Example 1 | Example 2 | Example 3 | Example 4 |
|---|---|---|---|---|---|
| Amount of filler | | | | | |
| calcium carbonate | 90 | 90 | 90 | 90 | 90 |
| carbon black | 100 | 90 | 75 | 90 | 75 |
| perlite | 0 | 10 | 25 | 0 | 0 |
| pulverized coal | 0 | 0 | 0 | 10 | 25 |
| Curability (min) | | | | | |
| Initial stage | | | | | |
| Pot life | 40 | 50 | 50 | 55 | 45 |
| Tack free time | 60 | 75 | 75 | 65 | 80 |
| 23° C. 2 W | | | | | |
| Pot life | 25 | 45 | 45 | 55 | 40 |
| Tack free time | 45 | 55 | 65 | 65 | 85 |
| 23° C. 4 W | | | | | |
| Pot life | 20 | 45 | 50 | 45 | 35 |
| Tack free time | 40 | 55 | 65 | 60 | 65 |
| Hardness (JIS A) | | | | | |
| 23° C. 1 day | 43 | 45 | 47 | 43 | 43 |
| 23° C. 7 days | 44 | 47 | 46 | 45 | 42 |
| Storage stability of base compound | | | | | |
| 50° C. 1 W | ○ | ○ | ○ | ○ | ○ |
| 50° C. 2 W | ○ | ○ | ○ | ○ | ○ |
| 50° C. 3 W | Δ | ○ | ○ | ○ | ○ |
| 50° C. 4 W | x | Δ | Δ | ○ | ○ |

○: no change Δ: viscosity was increased
x: surface was covered with film

EXAMPLES 5 and 6

A base compound was prepared by blending the polymer of Synthetic example 1 with plasticizers, fillers, and additives in the formulation shown in Table 4. Subsequently, 500 parts by weight of this base compound and 50 parts by weight of urethane prepolymer (isocyanate content 5.4 percent by weight) prepared by adding xylylene diisocyanate to polypropylene glycol were mixed. The length of time that the resulting mixture pulled up with a spatula was in a gel state was referred to as the pot life. The time that elapsed before the cured compound became unable to adhere to a polyethylene terephthalate sheet was referred to as the tack free time. Furthermore, a tensile strength test was conducted in a room (23° C.) based on JIS A-5758 by the use of float plate glass as an adherend. A specimen aged under the condition of 23° C. and 7 days was subjected to the tensile strength test, and the strength at break (N/cm$^2$) and the elongation at break (%) were measured. In addition, a sheet-shaped cured compound of 1 mm in thickness was prepared by the use of the resulting mixture, and the argon gas permeability coefficient was measured by an argon gas permeability test conducted based on JIS K-7126. Furthermore, a sheet-shaped cured compound of 1 mm in thickness was prepared similarly, and the,water vapor permeability was measured by a water vapor permeability test conducted based on JIS K-7129. The results thereof are shown in Table 6. The argon gas permeability coefficient in Example 5 was $1.81\times10^{-15}$ and, the argon gas permeability coefficient in Example 6 was $2.57\times10^{-15}$.

COMPARATIVE EXAMPLE 2

A base compound was prepared by blending the polymer of Synthetic example 1 with a plasticizer, fillers, and additives in the formulation shown in Table 5. Subsequently, 500 parts by weight of this base compound and 50 parts by weight of urethane prepolymer (isocyanate content 5.4 percent by weight) prepared by adding xylylene diisocyanate to polypropylene glycol were mixed. The measurement results of the pot life, the tack free time, the strength at break, the elongation at break, the argon gas permeability coefficient, and the water vapor permeability measured in a manner similar to that in Examples are shown in Table 6. In Comparative example 2, the argon gas permeability coefficient was a high $3.26\times10^{-15}$ and, therefore, the gas barrier properties were poor. The water vapor permeability was 26 and, therefore, the water vapor barrier properties were poor.

TABLE 4

| Raw Material | Formulation (parts by weight) |
|---|---|
| Polymer of Synthetic example 1 | 100 |
| Plasticizer aromatic hydrocarbon (trade name "Nisseki Hisol SAS-LH" produced by Nippon Petrochemicals Co., Ltd.) | 76 |
| hydrogenated terphenyl (trade name "ThermS-900" produced by Nippon Steel Chemical Co., Ltd.) | |
| Filler calcium carbonate | 210 |
| Filler carbon black (trade name Thermax MT N-990: SHIRAISHI CALCIUM KAISHA, LTD.) | 100 |
| Filler perlite (trade name Perlite B-409: Mitsui Mining & Smelting Co., Ltd.) | 10 |
| pulverized coal | |
| Curing catalyst di-n-butyltin dilaurate | 2 |
| Additive γ-glycidoxypropyltrimethoxysilane (trade name SH6040: Dow Corning Toray Silicone Co., Ltd.) | 2 |

TABLE 5

| Raw Material | Formulation (parts by weight) |
|---|---|
| Polymer of Synthetic example 1 | 100 |
| Plasticizer dioctyl phthalate | 56 |
| Filler calcium carbonate | 100 |
| Filler carbon black (trade name Thermax MT N-990: SHIRAISHI CALCIUM KAISHA, LTD.) | 90 |
| Filler perlite (trade name Perlite B-409: Mitsui Mining & Smelting Co., Ltd.) | 10 |
| Curing catalyst di-n-butyltin dilaurate | 2 |
| Additive γ-glycidoxypropyltrimethoxysilane (trade name SH6040: Dow Corning Toray Silicone Co., Ltd.) | 2 |

TABLE 6

| | Comparative example 2 | Example 5 | Example 6 |
|---|---|---|---|
| Plasticizer | dioctyl phthalate | aromatic hydrocarbon | hydrogenated terphenyl |
| Curability (min) | | | |
| Initial stage | | | |
| Pot life | 55 | 30 | 30 |
| Tack free time | 70 | 55 | 50 |

TABLE 6-continued

| | Comparative example 2 | Example 5 | Example 6 |
|---|---|---|---|
| H-type elasticity (23° C. 7 days) | | | |
| Strength at break (N/cm$^2$) | 124 | 122 | 119 |
| Elongation at break (%) | 79 | 92 | 74 |
| Argon gas permeability coefficient (mol · m/m$^2$ · s · Pa) | $3.26 \times 10^{-15}$ | $1.81 \times 10^{-15}$ | $2.57 \times 10^{-15}$ |
| Water vapor permeability | | | |
| (23° C. 90% RH) (g · mm/m$^2$ · day) | 26 | 17 | 19 |

EXAMPLES 7 to 9

A base compound was prepared by blending the polymer of Synthetic example 1 with a plasticizer, fillers, and additives in the formulation shown in Table 7. Subsequently, 500 parts by weight of this base compound and 50 parts by weight of urethane prepolymer (isocyanate content 5.4 percent by weight) prepared by adding xylylene diisocyanate to polypropylene glycol were mixed. The length of time that the resulting mixture pulled up with a spatula was in a gel state was referred to as the pot life. The time that elapsed before the cured compound became unable to adhere to a polyethylene terephthalate sheet was referred to as the tack free time. Furthermore, a tensile strength test was conducted in a room (23° C.) based on JIS A-5758 by the use of float plate glass as an adherend. A specimen aged under the condition of 23° C. and 7 days was subjected to the tensile strength test, and the strength at break (N/cm$^2$) and the elongation at break (%) were measured. Likewise, the pot life, the tack free time, the strength at break, and the elongation at break were measured with respect to the base compound stored at 40° C. for 2 weeks or 4 weeks. The results thereof are shown in Table 9. The reduction of the pot life after the base compound was stored at 40° C. was able to be suppressed by addition of the perlite. Furthermore, the reduction of the elongation at break of the H-type elasticity was able to be suppressed by addition of the white carbon and the acid clay.

COMPARATIVE EXAMPLE 3

A base compound was prepared by blending the polymer of Synthetic example 1 with a plasticizer, fillers, and additives in the formulation shown in Table 8. Subsequently, 500 parts by weight of this base compound and 50 parts by weight of urethane prepolymer (isocyanate content 5.4 percent by weight) prepared by adding xylylene diisocyanate to polypropylene glycol were mixed. The measurement results of the pot life, the tack free time, the strength at break, and the elongation at break measured in a manner similar to that in Examples are shown in Table 9. In Comparative example 3, after the base compound was stored at 40° C., the pot life was significantly decreased from 35 minutes to 15 minutes and, therefore, a large change in the curability due to the storage was observed. Furthermore, the elongation at break of the H-type elasticity was decreased from 83% to 38%.

TABLE 7

| Raw Material | Formulation (parts by weight) |
|---|---|
| Polymer of Synthetic example 1 | 100 |
| Plasticizer aromatic hydrocarbon (trade name "Nisseki Hisol SAS-LH" produced by Nippon Petrochemicals Co., Ltd.) | 76 |
| Filler calcium carbonate | 210 |
| Filler carbon black (trade name Thermax MT N-990: SHIRAISHI CALCIUM KAISHA, LTD.) | 100 |
| Filler perlite (trade name Perlite B-409: Mitsui Mining & Smelting Co., Ltd.) | 10 |
| white carbon (trade name SILPHONITE M-1: MIZUSAWA INDUSTRIAL CHEMICALS, LTD.) | |
| acid clay (trade name MIZUKA-ACE #300: MIZUSAWA INDUSTRIAL CHEMICALS, LTD.) | |
| Curing catalyst di-n-butyltin dilaurate | 2 |
| Additive γ-glycidoxypropyltrimethoxysilane (trade name SH6040: Dow Corning Toray Silicone Co., Ltd.) | 2 |

TABLE 8

| Raw Material | Formulation (parts by weight) |
|---|---|
| Polymer of Synthetic example 1 | 100 |
| Plasticizer aromatic hydrocarbon (trade name "Nisseki Hisol SAS-LH" produced by Nippon Petrochemicals Co., Ltd.) | 76 |
| Filler calcium carbonate | 210 |
| Filler carbon black (trade name Thermax MT N-990: SHIRAISHI CALCIUM KAISHA, LTD.) | 110 |
| Curing catalyst di-n-butyltin dilaurate | 2 |
| Additive γ-glycidoxypropyltrimethoxysilane (trade name SH6040: Dow Corning Toray Silicone Co., Ltd.) | 2 |

TABLE 9

| Filler | Comparative example 3 | Example 7 perlite | Example 8 white carbon | Example 9 acid clay |
|---|---|---|---|---|
| Initial stage | | | | |
| Curability (min) | | | | |
| Pot life | 35 | 45 | 55 | 55 |
| Tack free time | 45 | 55 | 65 | 60 |
| H-type elasticity (23° C. 7 days) | | | | |
| Strength at break (N/cm$^2$) | 128 | 114 | 87 | 99 |
| Elongation at break (%) | 83 | 93 | 104 | 101 |
| Base compound storage 40° C. 2 W | | | | |
| Curability (min) | | | | |
| Pot life | 15 | 40 | 70 | 65 |
| Tack free time | 40 | 50 | 90 | 80 |
| H-type elasticity (23° C. 7 days) | | | | |
| Strength at break (N/cm$^2$) | 126 | 156 | 114 | 109 |
| Elongation at break (%) | 53 | 49 | 87 | 105 |

TABLE 9-continued

| Filler | Comparative example 3 | Example 7 perlite | Example 8 white carbon | Example 9 acid clay |
|---|---|---|---|---|
| Base compound storage 40° C. 4 W | | | | |
| Curability (min) | | | | |
| Pot life | 15 | 40 | 60 | 60 |
| Tack free time | 30 | 60 | 65 | 65 |
| H-type elasticity (23° C. 7 days) | | | | |
| Strength at break (N/cm$^2$) | 115 | 124 | 105 | 112 |
| Elongation at break (%) | 383 | 30 | 72 | 89 |

EXAMPLE 10

A base compound was prepared by blending the polymer of Synthetic example 1 with a plasticizer, fillers, and additives in the formulation shown in Table 10. Subsequently, 500 parts by weight of this base compound and 50 parts by weight of urethane prepolymer (isocyanate content 5.4 percent by weight) prepared by adding xylylene diisocyanate to polypropylene glycol were mixed. A rectangular parallelepiped cured compound having a length of 8 cm, a width of 3 cm, and a height of 1 cm was prepared by the use of the resulting mixture, and the hardness (JIS A) of the cured compound was measured. The results thereof are shown in Table 12.

EXAMPLE 11

A base compound was prepared by blending the polymer of Synthetic example 1 with a plasticizer, fillers, and additives in the formulation shown in Table 11. Subsequently, 500 parts by weight of this base compound and 50 parts by weight of urethane prepolymer (isocyanate content 5.4 percent by weight) prepared by adding xylylene diisocyanate to polypropylene glycol were mixed. The hardness (JIS A) of the cured compound measured in a manner similar to that in Example 10 is shown in Table 12. In Example 11, the hardness of 10 or more is exhibited at 23° C. for 2 hours and, therefore, the hardness can be attained excellently.

TABLE 10

| Raw Material | Formulation (parts by weight) |
|---|---|
| Polymer of Synthetic example 1 | 100 |
| Plasticizer aromatic hydrocarbon (trade name "Nisseki Hisol SAS-LH" produced by Nippon Petrochemicals Co., Ltd.) | 76 |
| Filler calcium carbonate | 210 |
| Filler carbon black (trade name Thermax MT N-990: SHIRAISHI CALCIUM KAISHA, LTD.) | 100 |
| Filler acid clay (trade name MIZUKA-ACE #300: MIZUSAWA INDUSTRIAL CHEMICALS, LTD.) | 10 |
| Curing catalyst di-n-butyltin dilaurate | 2 |
| Additive γ-glycidoxypropyltrimethoxysilane (trade name SH6040: Dow Corning Toray Silicone Co., Ltd.) | 2 |

TABLE 11

| Raw Material | Formulation (parts by weight) |
|---|---|
| Polymer of Synthetic example 1 | 100 |
| Plasticizer aromatic hydrocarbon (trade name "Nisseki Hisol SAS-LH" produced by Nippon Petrochemicals Co., Ltd.) | 77.85 |
| Filler calcium carbonate | 210 |
| Filler carbon black (trade name Thermax MT N-990: SHIRAISHI CALCIUM KAISHA, LTD.) | 100 |
| Filler acid clay (trade name MIZUKA-ACE #300: MIZUSAWA INDUSTRIAL CHEMICALS, LTD.) | 10 |
| Curing catalyst tris(acetylacetone)indium (trade name Nacem Indium: Nihon Kagaku Sangyo Co., Ltd.) | 0.15 |
| Additive γ-glycidoxypropyltrimethoxysilane (trade name SH6040: Dow Corning Toray Silicone Co., Ltd.) | 2 |

TABLE 12

| Curing catalyst Cured compound hardness (JIS A) 23° C. | Example 10 tin di-butyltin dilaurate | Example 11 indium tris(acetylacetone)indium |
|---|---|---|
| 2 hours | x | 17 |
| 3 hours | 4 | 25 |
| 4 hours | 8 | 30 |
| 5 hours | 13 | 31 |
| 6 hours | 15 | 32 |
| 1 day | 32 | 37 |
| 7 days | 40 | 41 |

INDUSTRIAL APPLICABILITY

The curing composition of the present invention has satisfactory storage stability of base compound and, in addition, satisfactory curability even after storage of the base compound. The cured compound after curing has high mechanical strength and, in addition, has sufficient strength at break, hardness, and gas-barrier properties. Consequently, the cured compound is widely used as a sealing material for insulating glass manufacture, vehicle window frames, etc. Furthermore, the curing composition of the present invention is also suitable for use as sealants for construction, adhesives, coating compounds, etc.

The invention claimed is:

1. A curing composition comprising:

1) a polymer having two or more thiol groups per molecule, 2) a compound having two or more isocyanate groups per molecule, 3) carbon black, and 4) a filler containing 60wt % or more of i) silicic acid or ii) a silicate, and, optionally 5) an organic filler containing 90wt % or more of pulverized coal.

2. The curing composition according to claim 1, wherein the filler is silicic acid or silicate and the organic filler is pulverized coal.

3. The curing composition according to claim 1, in which the molar ratio (isocyanate groups/thiol groups) of isocyanate groups in the compound having two or more isocyanate groups per molecule to thiol groups in the polymer having two or more thiol groups per molecule is 0.5 to 4.0.

4. The curing composition according to claim 1, comprising 20 to 200 parts by weight of carbon black relative to 100 parts by weight of the sum of the polymer having two or more thiol groups per molecule and the compound having two or more isocyanate groups per molecule.

5. The curing composition according to claim 1, comprising 0.5 to 50 parts by weight of the filler relative to 100 parts by weight of the sum of the polymer having two or more thiol groups per molecule and the compound having two or more isocyanate groups per molecule.

6. The curing composition according to claim 1, comprising 0.5 to 150parts by weight of the organic filler relative to 100 parts by weight of the sum of the polymer having two or more thiol groups per molecule and the compound having two or more isocyanate groups per molecule.

7. The curing composition according to claim 1, comprising 10 to 100 parts by weight of hydrocarbon plasticizer relative to 100 parts by weight of the sum of the polymer having two or more thiol groups per molecule and the compound having two or more isocyanate groups per molecule.

8. The curing composition according to claim 1, further comprising an organometallic compound.

9. A curing composition comprising:

1) a polymer having two or more thiol groups per molecule,
2) a compound having two or more isocyanate groups per molecule,
3) carbon black,
4) a filler containing 60wt % or more of i) silicic acid or ii) a silicate, and
5) an organic filler containing 90wt % or more of pulverized coal.

10. The curing composition according to claim 9, wherein the filler is silicic acid or silicate and the organic filler is pulverized coal.

11. The curing composition according to claim 9, in which the molar ratio (isocyanate groups/thiol groups) of isocyanate groups in the compound having two or more isocyanate groups per molecule to thiol groups in the polymer having two or more thiol groups per molecule is 0.5 to 4.0.

12. The curing composition according to claim 9, comprising 20 to 200 parts by weight of carbon black relative to 100 parts by weight of the sum of the polymer having two or more thiol groups per molecule and the compound having two or more isocyanate groups per molecule.

13. The curing composition according to claim 9, comprising 0.5 to 50 parts by weight of the filler relative to 100 parts by weight of the sum of the polymer having two or more thiol groups per molecule and the compound having two or more isocyanate groups per molecule.

14. The curing composition according to claim 9, comprising 0.5 to 150 parts by weight of the organic filler relative to 100 parts by weight of the sum of the polymer having two or more thiol groups per molecule and the compound having two or more isocyanate groups per molecule.

15. The curing composition according to claim 9, comprising 10 to 100 parts by weight of hydrocarbon plasticizer relative to 100 parts by weight of the sum of the polymer having two or more thiol groups per molecule and the compound having two or more isocyanate groups per molecule.

16. The curing composition according to claim 9, further comprising an organometallic compound.

17. The curing composition according to claim 1, wherein the silicic acid is white carbon.

18. The curing composition according to claim 1, wherein the silicate is perlite or acid clay.

19. The curing composition according to claim 9, wherein the silicic acid is white carbon.

20. The curing composition according to claim 9, wherein the silicate is perlite or acid clay.

* * * * *